April 26, 1960

C. K. STEDMAN 2,934,329

ANGULAR ACCELEROMETER

Filed Jan. 7, 1957

INVENTOR.
CECIL K. STEDMAN
BY
ATTORNEY

April 26, 1960  C. K. STEDMAN  2,934,329
ANGULAR ACCELEROMETER
Filed Jan. 7, 1957  2 Sheets-Sheet 2
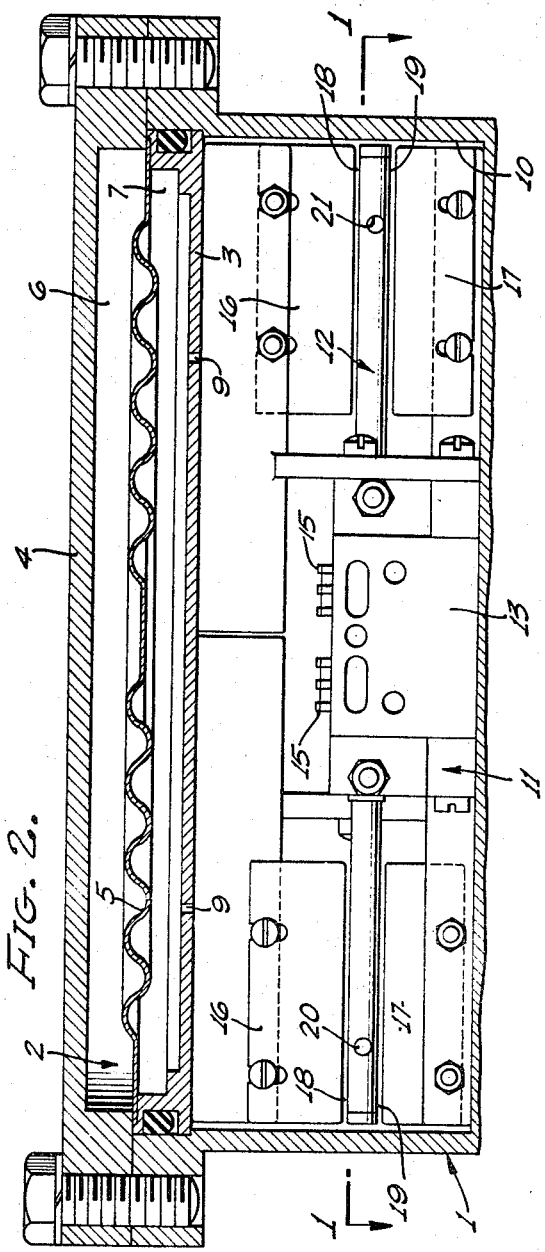
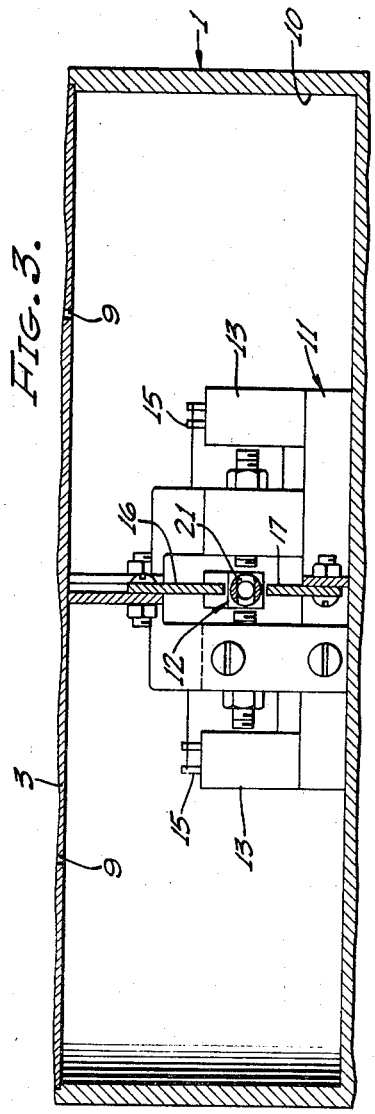
INVENTOR.
CECIL K. STEDMAN
BY
ATTORNEY

United States Patent Office 2,934,329
Patented Apr. 26, 1960

2,934,329
ANGULAR ACCELEROMETER

Cecil K. Stedman, Enumclaw, Wash., assignor to Statham Instruments, Inc., a corporation of California Application January 7, 1957, Serial No. 632,903

13 Claims. (Cl. 264—1)

This invention relates to a motion responsive device for indicating and recording the magnitude and nature of motions of an object in space. It belongs to the general class of motion sensing devices such as accelerometers.

The conventional examples of such systems include devices in which the effective inertial mass is a solid mass suspended on springs and the nature and magnitude of the displacement of the mass on the springs are a measure of the magnitude and nature of the motion.

Instead of using a solid mass suspended on springs, as in the prior art, I employ a liquid mass as the effective inertial mass and measure the acceleration of the liquid mass in the container subjected to the motion to be sensed.

In applications of Louis D. Statham, Serial No. 241,539, filed August 13, 1951, now Patent No. 2,778,905, Serial No. 328,416, filed December 29, 1952, now Patent No. 2,778,623, Serial No. 431,764, filed May 24, 1954, now Patent No. 2,778,624 and in my co-pending specification Serial No. 577,707, filed April 12, 1956, of which this application is a continuation-in-part, are disclosed such devices where liquid mass is used instead of a solid inertial mass, and thus one may use a large mass without introducing a large hinge, such as would be necessary were one to use a solid mass of equivalent weight. Such a large weight would require a large hinge or pivots or springs in order to withstand mechanical shocks. Because, as stated above, one uses as the effective inertial mass, a liquid mass, and does not employ a solid mass as the effective inertial mass, one may avoid the use of hinges and pivots of the size necessary where the effective inertial mass is solid rather than liquid.

By placing a movable member immersed in the liquid and mounted for motion relative to the liquid in the container, the relative motion of the liquid and the container wall will cause the movable member to be displaced, as a result of a difference in pressure on both sides of the movable member. By mounting the member so that it is movable relative to the container body, the acceleration of the liquid will produce a thrust on the movable member.

The motion of the liquid is damped by viscous drag. In order to increase the damping effect, there is added an additional damping means, by causing the fluid to flow through an orifice. The result of this arrangement not only gives an additional damping effect but has the property that it tends to maintain a more nearly constant damping coefficient for the instrument, notwithstanding temperature changes and consequent changes in viscosity of the liquid, than would be obtained if the orifice were not employed.

In the instant invention the liquid mass serves as the rotor so that the weight of the paddle which must be supported along the sensitive axis can be made extremely low. Baffles are fixedly mounted above and below the paddle, such baffles being disposed parallel to the axis of the paddle and spaced closely adjacent thereto. Thus, the separation between the edges of the paddle and the inner chamber walls form fluid communication passageways, and the spaces between the baffles and paddles form other fluid communicating passages. When the instrument is subjected to an angular acceleration, the inertial forces will cause the liquid to circulate and develop a pressure against the paddle. The paddle will deflect angularly until the elastic restraint of the flexure and the pickoff (mechanism for sensing the motion) balances the forces on the paddle. The novel structure of the invention can be readily adapted to the use of a variety of pickoff mechanisms.

It is not necessary for the paddle to have any substantial mass; all that is required is that it be structurally rigid. The buoyancy of the paddle reduces the weight of the paddle in the liquid. Preferably and ideally, the weight of the paddle in air may be made equal to the weight of the liquid displaced by the paddle when it is mounted in the device where it is immersed in the liquid forming the effective inertial mass. Such a paddle may be termed buoyant, i.e., having substantially no effective mass when immersed in said liquid. Accordingly, the paddle is preferably constructed as a hollow member with sealed ends so that its weight, when immersed in the liquid, is relatively small, and ideally may be made substantially equal to zero. The buoyancy reduces the weight of the paddle in liquid. The use of a buoyant paddle also eliminates the necessity for careful balance of the suspended mass to minimize the sensitivity of the instrument to linear accelerations and angular velocity.

The paddles and baffles separate the chamber into a plurality of subchambers which are in fluid communication with each other through the orifices formed by the spaces between the paddle and the baffle edges and between the paddle ends and the chamber wall. On clockwise angular acceleration of the chamber a counter-clockwise circulation occurs in each of the subchambers, the liquid flowing in opposite directions on the two sides of the baffle. A circulation also occurs through the orifices on one side of the chamber and in the opposite direction on the other side of the chamber, i.e., through the paddle orifices between the paddle and baffles and between the paddle ends and the chamber wall. The flow through the gaps may thus be defined as in parallel with the flow in each subchamber.

It has been previously observed that the damping ratio or coefficient in such a structure in which the inertial fluid is a liquid whose viscosity changes with temperature, also varies with the temperature.

The damping characteristics of such instruments are such that as the viscosity of the inertial liquid decreases, the damping ratio decreases, passes through a minimum, and then again increases, as the viscosity decreases. This minimum usually extends over a range of viscosity whereinbe the value of the damping ratio changes but in an unappreciable amount. For convenience, this damping ratio may be termed the minimum damping ratio, and the viscosity, or viscosity at the minimum value of the damping ratio, the minimum viscosity.

It has been observed that for any given instrument design the value of the minimum damping ratio depends on the resistance to flow of the liquid in the orifices and also on resistance to flow in the subchambers, and is approximately equal to the following ratio:

$$\frac{1}{(r/R+1)^{1/2}} \qquad \text{(Eq. 1)}$$

where $r$ is the resistance to flow through the paddle gaps, and $R$ is the resistance to flow in the subchambers.

In such an accelerometer the natural frequency of the device as determined at the ninety degree phase shift (a measure of the natural frequency) and the true range are each substantially inversely proportional to the inertia of the liquid and the damping ratio is substantially directly proportional to the said inertia.

The value of the true range is referred to zero frequency and is valid for all frequencies where the ratio of angular displacement of the paddle to the displacement of the paddle at zero frequency is substantially constant when the same acceleration is given to the instrument at the various frequencies. This chosen angular displacement of the paddle is dependent on the maximum displacement permitted by the transducer chosen. If an electrical resistance strain wire transducer is employed, it is the angular displacement which will strain the wire to the maximum permissible strain.

For any design, the range, frequency and damping ratio is dependent on the inertia of the liquid in the chamber. I may, by my invention, reduce the value of the inertia effective in displacing the paddle without modifying any dimensional characteristics or any of the other design characteristics of the instrument, and thus I may obtain a variation in the natural frequency and damping characteristics. The modification of my invention will produce an increase in the natural frequency and in the range and in the damping ratio.

I accomplish this result by perforating the paddle so that a fluid flow through the perforated paddle is possible, in addition to flow through the paddle orifices. The natural frequency of the instrument depends in part on the plug or plugs of fluid that flow through these paddle perforations. In order to reduce the velocity of the flow through the paddle perforations I may provide a plurality of such perforations or increase their cross-sectional area to reduce the velocity of flow of the plug of liquid flowing through the perforation to the low value desired.

I may thus in addition to the other parameters which determine natural frequency, range and damping ratio, such as the radius of the annular channel, its depth, the width and length of paddle orifices, diameter of the paddle, height of liquid above the paddle, provide an additional flexibility to the design of the instrument to alter in a simple, flexible and convenient manner the above characteristics by a design modification which lends itself readily to alteration where frequently the alterations of other design characteristics of the accelerometer is impractical or undesirable for other reasons.

These and other objects of my invention will be further described in connection with the drawings, of which:

Fig. 2 is an irregular horizontal section taken on line 2—2 of Fig. 1; and

Fig. 3 is a section taken on line 3—3 of Fig. 1.

Figure 1:
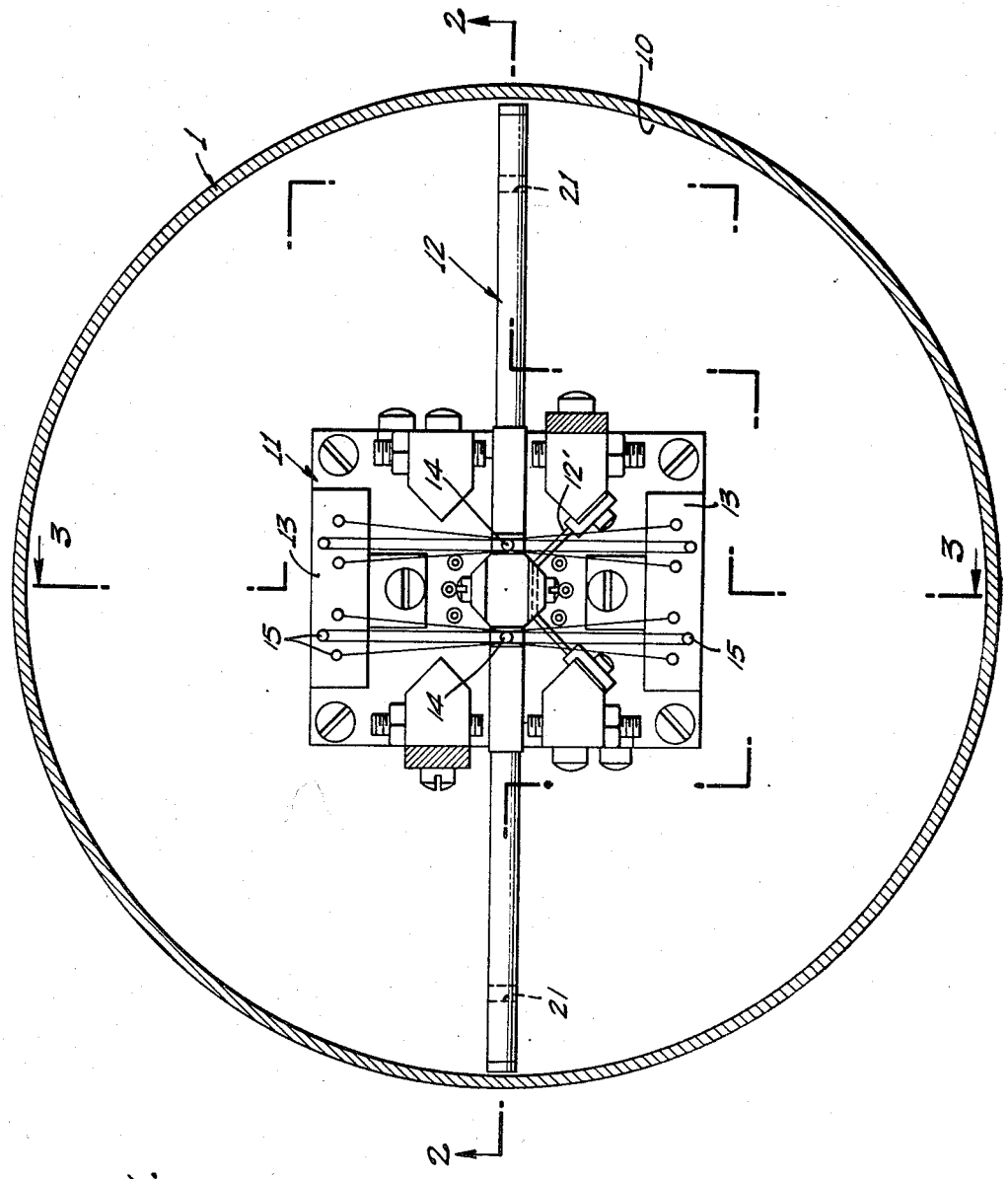
Fig. 1 is an irregular horizontal section of my device taken on line 1—1 of Fig. 2.

The device shown in the drawings is substantially identical with the device described in my co-pending application Serial No. 577,707, except for the omission of the auxiliary baffle orifices shown in said co-pending case, which may also be used here for like purposes.

The device employs a case 1 in which is carried an expansion chamber 2 sealed by a bottom 3 and a cover 4 and separated by a flexible diaphragm 5 into an air chamber 6 open to ambient pressure and a chamber 7 communicating with the accelerometer chamber 10 via ports 9. The accelerometer chamber 10 (see Fig. 1) formed by the case 1 is shown as circular but may be of any desired cross section.

Centrally positioned in the chamber 10 is an island 11 on which is mounted a paddle 12 on a Cardan spring suspension 12' so that the paddle is symmetrical about its center and is statically balanced on the spring suspension. I provide one or more perforations 21 in the paddle which form a liquid communicating passageway from one side of the paddle to the other side of the paddle. The perforations are preferably symmetrical, i.e., the orifices on one side of the center of the paddle are identical in size, configuration and placement to those on the opposite side of the paddle center. The axis of the perforations is transverse to and preferably perpendicular to the axis of rotation of the paddle and the mouths of the perforations are transverse to and preferably perpendicular to the direction of motion of the paddle.

The paddle carries insulating pins 14 and the blocks 13 mounted on island 11, carry insulating pins 15. Unbonded electrical resistance strain wires are stretched between 14 and 15 in each side of the center thereof. Across the diameter of the chamber 10 are vertically adjustable baffles 16 and 17 mounted so that the desired spacing 18 and 19 may be provided between the paddle and the baffle. The paddle ends are positioned closely adjacent to but are spaced from the wall of the chamber.

While I have described a particular embodiment of my invention for the purpose of illustration, it should be understood that various modifications and adaptations thereof may be made within the spirit of the invention as set forth in the appended claims.

I claim:

1. A motion sensing device, comprising a case, a closed chamber in said case, a liquid inertial mass in said chamber, a perforated paddle in said chamber immersed in said liquid, said paddle being of substantially no effective mass when immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, the separation between the edge of the paddle and said wall forming a fluid communicating passageway, said paddle being positioned on said mounting for limited motion on said mounting with respect to said case on angular acceleration of said case, said mounting restraining motion of said paddle with respect to said case in the absence of acceleration of said case, and means for sensing said motion.

2. A motion sensing device, comprising a case, a closed chamber in said case, a liquid inertial mass in said chamber, a perforated paddle in said chamber immersed in said liquid, said paddle being of substantially no effective mass when immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, a baffle positioned in said chamber extending along said paddle and spaced therefrom, a liquid communication passageway for fluid movement from one side of said paddle to the other side of said paddle and between the edge of said paddle and said wall and between said paddle and said baffle, said paddle being positioned on said mounting for limited angular motion on said mounting with respect to said case on angular acceleration of said case, said mounting restraining motion of said paddle with respect to said case in the absence of angular acceleration of said case, and means for sensing said motion.

3. A motion sensing device, comprising a case, a closed chamber in said case, said chamber being in the form of a cylinder and having opposing cylindrical wall portions, a liquid inertial mass in said chamber, a perforated paddle of substantially no effective mass when immersed in said liquid, said liquid being the inertial mass and the effective rotor of said device, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absense of angular acceleration of said case about said axis, said paddle extending from one wall portion to the opposing wall portion and immersed in said liquid, opposing edges of said paddle being adjacent the opposing cylindrical wall portions, an edge of said paddle being spaced from the adjacent cylindrical wall of the chamber, and a motion sensing device connected to said paddle to sense the angular displacement of said paddle.

4. A motion sensing device, comprising a case, a closed chamber in said case, said chamber being in the form of a cylinder and having opposing cylindrical wall portions, a liquid inertial mass in said chamber, a perforated paddle of substantially no effective mass when immersed in said liquid, said liquid being the inertial mass and the effective rotor of said device, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absense of angular acceleration of said case about said axis, said paddle extending from one wall portion to the opposing wall portion and immersed in said liquid, opposing edges of said paddle being adjacent the opposing cylindrical wall portions, an edge of each side of the paddle being spaced from the adjacent wall of the chamber, a baffle positioned in said chamber parallel to said paddle and spaced therefrom, and a motion sensing device connected to said paddle to sense the angular displacement of said paddle.

5. A motion sensing device comprising a case, a closed chamber in said case, said chamber being in the form of a cylinder and having opposing cylindrical wall portions a liquid inertial mass in said chamber, a perforated paddle in said chamber and immersed in said liquid, said paddle being of substantially no effective mass when immersed in said liquid, said liquid being the inertial mass and the effective rotor of said device, a hinge for said paddle, said hinge being connected to said paddle, a mounting for said hinge in said chamber, said mounting being connected to said case and to said hinge, said paddle being rotatably mounted about said hinge on the axis of said cylinder, for limited angular motion of said paddle about said axis and with respect to said case on angular acceleration of said case about said axis, said paddle extending from one wall portion to the opposing portion, opposing edges of said paddle being adjacent the opposing cylindrical wall portions, said hinge restraining motion of said paddle with respect to said case about said axis, and a motion sensing device connected to said paddle to sense the angular displacement of said paddle with respect to said case.

6. A motion sensing device, comprising a case, a closed chamber in said case, a liquid inertial mass in said chamber, a hollow perforated paddle in said chamber immersed in said liquid, said paddle being of substantially no effective mass when immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, the separation between the edge of the paddle and said wall forming a fluid communicating passageway, said paddle being positioned on said mounting for limited motion on said mounting with respect to said case on angular acceleration of said case, said mounting restraining motion of said paddle with respect to said case in the absence of acceleration of said case, and means for sensing said motion.

7. A motion sensing device, comprising a case, a closed chamber in said case, a liquid inertial mass in said chamber, a hollow perforated paddle in said chamber immersed in said liquid, said paddle being of substantially no effective mass when immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, a baffle positioned in said chamber extending along said paddle and spaced therefrom, a liquid communication passageway for fluid movement from one side of said paddle to the other side of said paddle and between the edge of said paddle and said wall and between said paddle and said baffle, said paddle being positioned on said mounting for limited angular motion on said mounting with respect to said case on angular acceleration of said case, said mounting restraining motion of said paddle with respect to said case in the absence of angular acceleration of said case, and means for sensing said motion.

8. A motion sensing device, comprising a case, a closed chamber in said case, said chamber being in the form of a cylinder and having opposing cylindrical wall portions, a liquid inertial mass in said chamber, a hollow perforated paddle of substantially no effective mass when immersed in said liquid, said liquid being the inertial mass and the effective rotor of said device, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absence of angular acceleration of said case about said axis, said paddle extending from one wall portion to the opposing wall portion and immersed in said liquid, opposing edges of said paddle being adjacent the opposing cylindrical wall portions, and a motion sensing device connected to said paddle to sense the angular displacement of said paddle.

9. A motion sensing device comprising a case, a closed chamber in said case, said chamber being in the form of a cylinder and having opposing cylindrical wall portions, a liquid inertial mass in said chamber, a hollow perforated paddle in said chamber and immersed in said liquid, said paddle being of substantially no effective mass when immersed in said liquid, said liquid being the inertial mass and the effective rotor of said device, a hinge for said paddle, said hinge being connected to said paddle, a mounting for said hinge in said chamber, said mounting being connected to said case and to said hinge, said paddle being rotatably mounted about said hinge on the axis of said cylinder, for limited angular motion of said paddle about said axis and with respect to said case on angular acceleration of said case about said axis, said paddle extending from one wall portion to the opposing wall portion, opposing edges of said paddle being adjacent the opposing cylindrical wall portions, an edge of said paddle being spaced from the adjacent cylindrical wall of the case, said hinge restraining motion of said paddle with respect to said case in the absence of angular acceleration of said case about said axis, and a motion sensing device connected to said paddle to sense the angular displacement of said paddle with respect to said case.

10. A motion sensing device comprising a case, a closed chamber in said case, said chamber being in the form of a cylinder and having opposing cylindrical wall portions, a liquid inertial mass in said chamber, a hollow perforated paddle in said chamber and immersed in said liquid, said paddle being of substantially no effective mass when immersed in said liquid, said liquid being the inertial mass and the effective rotor of said device, a hinge for said paddle, said hinge being connected to said paddle, a mounting for said hinge in said chamber, said mounting being connected to said case and to said hinge, said paddle being rotatably mounted about said hinge on the axis of said cylinder, for limited angular motion of said paddle about said axis and with respect to said case on angular acceleration of said case about said axis, said paddle extending from one wall portion to the opposing wall portion, opposing edges of said paddle being adjacent the opposing cylindrical wall portions, an edge of each side of the paddle being spaced from the adjacent wall of the case, a baffle positioned in said chamber parallel to said paddle and spaced therefrom, said hinge restraining motion of said paddle with respect to said case in the absence of angular acceleration of said case about said axis, and a motion sensing device connected to said paddle to sense the angular displacement of said paddle with respect to said case.

11. A motion sensing device, comprising a case, a closed chamber in said case, a liquid inertial mass in said chamber, a perforated paddle in said chamber immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, the separation between the edge of the paddle and said wall forming a fluid communicating passageway, said paddle being positioned on said mounting for limited motion on said mounting with respect to said case on angular acceleration of said case, said mounting restraining motion of said paddle with respect to said case in the absence of acceleration of said case, and means for sensing said motion.

12. A motion sensing device, comprising a case, a closed chamber in said case, a liquid inertial mass in said chamber, a perforated elongated member in said chamber immersed in said liquid, said liquid being the inertial mass and the effective rotor of said device, a mounting for said member fixedly mounted in said chamber and connected to said case, said elongated member being movably mounted in said chamber with one edge of said member adjacent, but out of contact with, an enclosing wall of said chamber, the separation between the edge of said member and said wall forming a fluid communicating passageway, said elongated member being positioned on said mounting for limited motion on said mounting with respect to said case on angular acceleration of said case, said mounting restraining motion of said elongated member with respect to said case in the absence of acceleration of said case, and means for sensing said motion.

13. A motion sensing device, comprising a case, a closed chamber in said case, a liquid inertial mass in said chamber, a perforated paddle in said chamber immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, the separation between the edge of the paddle and said wall forming a fluid communicating passageway, said paddle being positioned on said mounting for limited motion on said mounting with respect to said case on angular acceleration of said case, said mounting restraining motion of said paddle with respect to said case in the absence of acceleration of said case, an electrical strain wire transducer connected to said paddle for sensing said motion.

References Cited in the file of this patent

UNITED STATES PATENTS

| | | |
|---|---|---|
| 767,372 | Arcioni | Aug. 16, 1904 |
| 932,885 | Munn et al. | Aug. 31, 1909 |
| 2,778,624 | Statham | Jan. 22, 1957 |